United States Patent [19]

Biggs et al.

[11] 4,317,964
[45] Mar. 2, 1982

[54] OFF-HOOK/ON-HOOK STATUS CHECK CIRCUIT

[75] Inventors: Ronald D. Biggs, Zionsville; Peter O. Schuh, Noblesville, both of Ind.

[73] Assignee: Bell Telephone Laboratories, Incorporated, Murray Hill, N.J.

[21] Appl. No.: 165,552

[22] Filed: Jul. 30, 1980

[51] Int. Cl.³ .......................................... H04M 1/00
[52] U.S. Cl. .............................. 179/81 R; 179/1 MN
[58] Field of Search .......... 179/16 AA, 16 A, 18 AB, 179/90 B, 90 BB, 90 BD, 5 R, 5 P, 6.02, 2 A, 2 AM, 81 R, 1 MN

[56] References Cited

U.S. PATENT DOCUMENTS

| | | | |
|---|---|---|---|
| 3,128,351 | 4/1964 | Hohmann, Jr. et al. | 179/90 BB |
| 3,205,312 | 9/1965 | Brightman et al. | 179/18 F |
| 3,614,334 | 10/1971 | Bonvallet | 179/1 MN |
| 3,819,866 | 6/1974 | Hawley | 179/16 AA |
| 3,932,707 | 1/1976 | Connolly et al. | 179/16 AA |
| 4,001,520 | 1/1977 | Waldman et al. | 179/81 R |
| 4,171,469 | 10/1979 | Brooks | 179/18 BA |
| 4,209,668 | 6/1980 | Weinberger et al. | 179/90 B |
| 4,220,825 | 9/1980 | Fahey | 179/18 FA |

Primary Examiner—Thomas W. Brown
Attorney, Agent, or Firm—T. H. Jackson

[57] ABSTRACT

An off-hook/on-hook status check circuit is adapted to be connected in series with either the tip (2) or the ring lead (3) of a telephone subscriber loop (1) at a location remote or apart from the telephone station set (13). The circuit comprises an opto-emitter subcircuit (7) in series with a capacitor (4). These are connected in parallel with a pulsing contact ($K_1$) which alternately permits the charging of the capacitor by the telephone central office voltage or its discharge through the opto-emitter subcircuit. As the capacitor may only be charged when the telephone station set is off-hook drawing loop current, the opto-emitter subcircuit provides a predetermined output when the capacitor discharges, identifying the off-hook condition of the telephone station set. No output from the opto-emitter subcircuit during the capacitor discharge interval identifies the on-hook condition of the set. If the present circuit comprises an element of a dial signaling system (10), the dial pulse signaling system is able to abort dial pulsing when the telephone set is on-hook and continued dial pulsing is not desirable.

11 Claims, 4 Drawing Figures

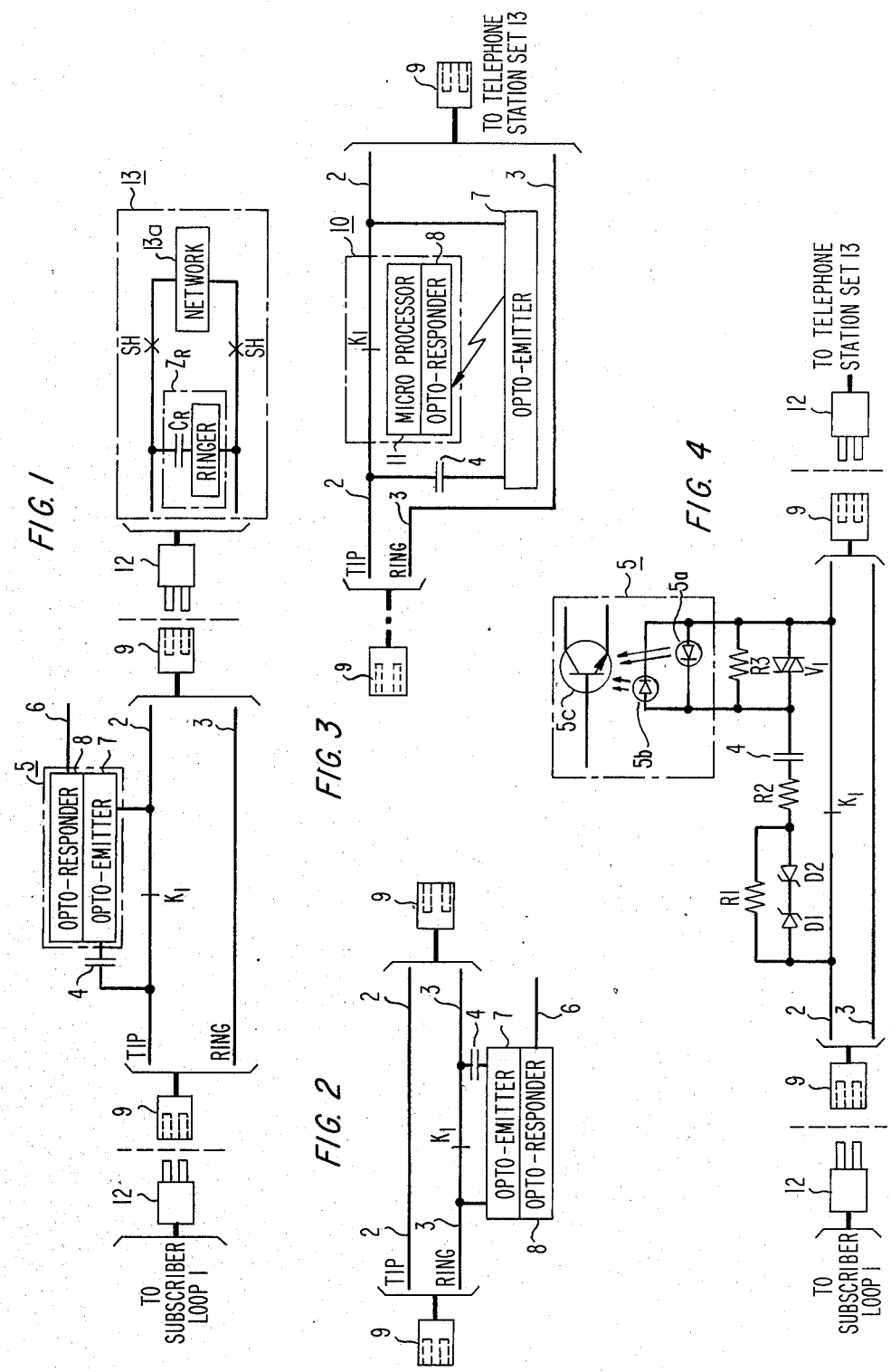

OFF-HOOK/ON-HOOK STATUS CHECK CIRCUIT

TECHNICAL FIELD

This invention relates to the identification of the on-hook or off-hook status of a telephone station set switchhook and, more particularly, to the identification of switchhook status at a location apart from the telephone station set.

BACKGROUND OF THE INVENTION

A common way of providing telephone subscribers with services that are not provided by the basic telephone station set is to incorporate them in an adjunct to the station set. One such adjunct is an automatic dialer. The adjunct dialer, which is typically connected in series between the associated telephone station set and the central office, often includes only the circuitry that is necessary to provide the dialing function. The adjunct dialer relies upon the associated telephone station set to provide the means for going off-hook and for acquiring dial tone from the central office. Thus when properly used, the adjunct dialer should be activated only after the telephone subcriber has removed the handset from the switchhook of the associated telephone station set and has recognized that dial tone has been returned from the central office.

A problem arises from this arrangement when the controls of the adjunct are operated before the handset is removed from the switchhook, loop current from the central office has been established through the adjunct, and dial tone has been returned. Automatic dialing will proceed unchecked until the entire telephone number has been outpulsed. If the user tries to correct the situation by removing the handset from the switchhook contacts, the telephone line will be seized by the continued outpulsing. As a result, the central office will respond by providing dial tone and by attempting to record the erroneously outpulsed digits. Alternatively, if the adjunct has been activated to dial the wrong telephone number and the user wishes to stop the automatic dialing, he must wait until the completion of dialing before starting a new operation. Thus it is believed apparent that a circuit which is able to detect switchhook status during dial pulsing is required so that continued dial pulsing may be immediately and automatically aborted whenever the associated telephone set is on-hook. The need for such control becomes more apparent if the automatic dialing is slow as in pulse dialing as opposed to multi-frequency tone dialing.

One solution to this problem is known, namely to transmit switchhook status information over a separate lead to the adjunct equipment. This lead proceeds from an extra contact of the associated telephone set's switchhook to the adjunct telephone station equipment. Off-hook or on-hook status information is provided over this lead to the adjunct equipment. Accordingly, the adjunct dialer is able to abort dialing if its controls are inadvertently operated when the telephone set is on-hook. There are then required in this embodiment at least three leads: the standard tip lead and ring lead, and an additional switchhook status lead. Hohmann et al., U.S. Pat. No. 3,128,351, which discloses an adjunct repertory dialer, is exemplary of apparatus which employ the additional lead for this purpose.

While this method provides a solution, it is desirable today, with the trend toward telephone station equipment modularity, to employ just two leads, the standard tip and ring leads, between the various items of station apparatus and to employ standard plug and jack arrangements to tie them together. In this manner, efficiencies in telephone equipment inventory control are achieved, and the subscriber is encouraged to install and to modify his telephone equipment arrangement without the aid of telephone company personnel. Exemplary plug and jack arrangements currently in use are described in Hardesty, U.S. Pat. No. 3,860,316, and its progeny and Krumreich et al., U.S. Pat. No. 3,850,497, and its progeny.

While it is desirable to provide a remote switchhook status check function without increasing the number of leads normally provided, it is likewise recognized that, in so doing, it is undesirable to increase the impedance of the telephone subscriber loop. Such an increase limits both the transmission and signaling distances from the central office where a telephone station set may be placed.

Another solution which is known is to provide a manually operated button for the adjunct dialer. The user of the dialer recognizing his mistake may cancel the dial pulsing by pushing the button before starting the dialing process anew. This means is undesirable because the burden of correcting the mistake is on the user. It is believed apparent that an automatic abortion of dialing is preferable.

R. L. Cerbone, application Ser, No. 122,431 filed Feb. 19, 1980, now U.S. Pat. No. 4,283,603, discloses an on-hook/off-hook status check circuit for a multifrequency tone dialing system. The Cerbone circuit includes a first opto-isolator connected in series with the subscriber loop and a second opto-isolator connected across the loop on the station set side of the circuit. These opto-isolators are sequentially activated to perform the switchhook status check. The Cerbone circuit, however, provides a means of seizing the line from the station set which is unnecessary in dial pulsing applications. Accordingly, it is preferred to apply the Cerbone circuit with automatic multi-frequency tone dialing systems.

Therefore, despite the above-described solutions, there remains a need for a switchhook status check circuit adapted for use with dial pulse dialing systems. This circuit should check for off-hook status during dial pulsing and abort dial pulsing if the associated telephone set is on-hook.

SUMMARY OF THE INVENTION

The above-stated problems and related problems are solved in accordance with the principles of the present circuit which is connected in series with either the tip or the ring lead of the telephone subscriber loop. In one embodiment, the circuit comprises the opto-emitter portion of an opto-isolator connected in series with a capacitor. These are connected in parallel with a single, normally closed pulsing contact. If the associated telephone station set is off-hook and the pulsing contact opens, the low resistance shunt created across the subscriber loop by the off-hook telephone set allows the capacitor to charge. When the pulsing contact returns to its normally closed state, the capacitor discharges through the contact and the opto-emitter portion of the opto-isolator. The opto-responder portion responds by providing an output identifying the off-hook condition of the telephone set switchhook. No such indication is provided if the station set is on-hook because the ringer capacitance of the telephone station set is already at full charge from the subscriber loop, and there is no charging path for the capacitor of the present circuit.

Comprising an element of an automatic dial pulsing system, the present circuit performs a status check after every dial pulse and automatically aborts dial pulsing when it is unnecessary.

The present off-hook/on-hook status check circuit is connected to the telephone station set with no additional leads beyond the standard tip and ring leads to the telephone station set. This is in accordance with current trends toward telephone station equipment modularity.

The present circuit may be used in combination with many forms of adjunct station equipment such as burglar alarm, energy management, telephone answering, or repertory dialing systems. When used with these systems, central office equipment capacity is saved, and the probability of call completion is increased.

Additionally, the maximum transmission length and signaling range from the telephone switching central office are not limited by the application of the present circuit in either its idle or busy state.

Noise abatement and pulsing contact protection are provided by associated additional circuitry. With the additional circuitry, the present circuit may be used with subscriber loops comprising cable pairs. With certain elements of the noise abatement and contact protection circuitry omitted, the present invention may be employed on subscriber loops comprising carrier system channels.

BRIEF DESCRIPTION OF THE DRAWING

FIG. 1 is a schematic drawing of one embodiment of the off-hook/on-hook status check circuit and an associated telephone station set.

FIG. 2 is a schematic drawing of a second embodiment of the off-hook/on-hook status check circuit, demonstrating its inherent flexibility of connection.

FIG. 3 is a schematic drawing of the embodiment of FIG. 1 in combination with an automatic dial pulse signaling system including a microprocessor.

FIG. 4 is a detailed schematic drawing of the embodiment of FIG. 1 including additional associated circuitry for noise abatement and pulsing contact protection.

DETAILED DESCRIPTION

Referring to FIG. 1, an off-hook/on-hook status check circuit exemplary of the present invention is shown including an opto-isolator subcircuit 5 connected in the tip lead 2 of a telephone subscriber loop 1. The opto-isolator subcircuit 5 comprises an opto-emitter portion 7 connected in series with an energy storage subcircuit 4 comprising a capacitor. Opto-isolator subcircuit 5 also comprises opto-responder portion 8 for providing an output on lead 6 responsive to opto-emitter portion 7. Capacitor 4 and opto-emitter 7 are connected in parallel with a normally closed pulsing contact $K_1$ which is shown connected in series with tip lead 2.

No additional leads beyond the tip and ring leads 2 and 3 are required to the present circuit to assure its operation. Accordingly standard plug and jack arrangements 12 and 9 in accordance with current telephone station set modularity trends may be employed to connect the present circuit between subscriber loop 1 and telephone station set 13.

The opto-emitter portion 7 may take any form of transducer that converts electric energy to light energy and does not materially interfere with the transmission of electrical energy. Such an element might be a light emitting diode.

The opto-responder 8 may take any form of transducer that converts light energy to an electrical signal so that output lead 6 from opto-isolator subcircuit 4 provides an electrical output signal on lead 6 to associated adjunct telephone station equipment.

As has been previously described, pulsing contact $K_1$ is normally closed so as to allow the unimpaired transmission of information to the telephone station set 13. In other words, there is normally no additional transmission loss associated with the application of the present circuit either during the idle state of the telephone station set 13 or when the telephone station set 13 is being used for signaling or for transmission of information. Pursuant to this objective, neither the maximum transmission length of the subscriber loop nor its signaling resistance range from the central office are limited by the application of the subject circuit in its idle state.

Only during dial pulsing, when it is desired to determine the switchhook status of telephone station set 13, is pulsing contact $K_1$ activated. Accordingly, transmission to the telephone set 13 is only interrupted for a brief interval called the break portion of the dial pulse signaling interval in order to determine the switchhook status. Thus during the talk or transmission mode of telephone station set 13, the circuit presents no transmission impairment.

While the present circuit will be subsequently described as connectable to adjunct repertory dialer equipment of the dial pulse signaling type, it is envisioned that other forms of adjunct telephone station equipment may employ the subject circuit such as automatic telephone answering equipment, energy management systems, telephone burglar systems, and the like.

The operation of the embodiment of FIG. 1 will now be described in detail. Contact $K_1$ permits the charging of capacitor 4 when it is opened during the break portion of the dial pulse signaling interval depending on the on-hook or off-hook status of the switchhook contacts SH of station set 13. If the telephone station set 13 is off-hook, the tip 2 and ring 3 are connected to a low resistance shunt path through network 13a of the telephone station set 13. Accordingly, the voltage provided by the telephone central office over subscriber loop 1 is allowed to charge capacitor 4 to the full central office line voltage. When contact $K_1$ returns to its normally closed state, called the make portion of the dial pulse signaling interval, capacitor 4 discharges through a closed path including opto-emitter 7 and contact $K_1$. Opto-responder 8, responsive to opto-emitter 7, provides an electrical output on lead 6 identifying the off-hook condition of telephone set 13.

On the other hand, if the telephone station set 13 is on-hook, only the ringer capacity $C_r$ of the telephone set 13 is connected across the subscriber loop 1. Accordingly, the ringer capacity $C_r$ is charged to the full central office line voltage. Opening contact $K_1$ does not charge capacitor 4 in this case; neither is there a discharge of capacitor 4 when contact $K_1$ again closes. Accordingly, no output appears on lead 6. A response of no output on lead 6 when contact $K_1$ opens and closes (breaks and makes) identifies the on-hook condition of the telephone set 13.

It may be seen that opto-responder 8 might also provide an off-hook indication on lead 6 when contact $K_1$ opens (breaks) and capacitor 4 charges. This response, however, is ignored. The response is believed to be unpredictable compared with the response received when pulsing contact $K_1$ closes (makes). In the preferred mode of operation, capacitor 4 discharges the full central office voltage through a known resistance path comprising opto-emitter 7 and closed contact $K_1$. The more open path including subscriber loop 1 may have a high level of impulse or alternating current noise which detracts from a true indication of off-hook status. A more detailed discussion of the noise problem is provided in the subsequent description of FIG. 4.

Referring to FIG. 2, a second embodiment of the off-hook/on-hook status check circuit of FIG. 1 is shown. Similar reference characters are used to designate similar elements of the embodiments of FIGS. 1 and 2 in order to demonstrate the inherent flexibility of the present invention. It is not required that opto-emitter 7 and capacitor 4 be connected in specific order. Likewise, it is not necessary that they, in combination with switch contact $K_1$, be connected in tip lead 2. As shown in FIG. 2, capacitor 4 may be connected on the station set 13 side of opto-emitter 7 and that the circuit may be connected in series with the ring lead 3 of the subscriber loop 1. It is believed apparent that the operation of the circuit of FIG. 2 is similar to the operation of the circuit of FIG. 1.

Referring to FIG. 3, the off-hook/on-hook status check circuit of FIG. 1 is shown in combination with an automatic dial pulse signaling system 10 which includes a microprocessor 11. The automatic dial pulse signaling system 10 may be in the form of adjunct repertory dialer equipment, automatic telephone answering and dialing equipment, energy management systems, home information systems, telephone burglar systems, or the like.

The embodiment shown in FIG. 3 is distinguished from FIGS. 1 and 2 in that pulsing contact $K_1$ and opto-responder 8 comprise elements of the automatic dial pulse signaling system 10. Accordingly, contact $K_1$ operates as the automatic dial pulsing contact whose operation is controlled by microprocessor 11. During the make interval, opto-responder 8, responsive to opto-emitter 7, reports to microprocessor 11 the status of the switchhook of telephone station set 13 in accordance with the previously discussed principles of the operation of the present invention. It should be noted that an optical output is provided by opto-emitter 7 in the embodiment of FIG. 3. It is not necessary that this output be electrical in nature as was provided on output lead 6 of the embodiment of FIG. 1.

Inadvertent activation of the adjunct occurs when the user properly removes the handset, closing switchhook contacts SH of telephone set 13, and then proceeds to misdial. In this event, the user may cancel the automatic pulsing process by simply depressing the switchhook which opens contacts SH of telephone set 13. The adjunct, during automatic dialing, recognizes the on-hook condition as pulsing contact $K_1$ moves from the break to the make portion of the dial pulsing interval. Microprocessor 11, which controls the activation of pulsing contact $K_1$, then aborts dial pulsing when it has determined that telephone station set 13 has been placed in the on-hook condition. It is believed apparent that to depress the switchhook contacts SH is a natural reaction of a telephone user when that user recognizes he has either misdialed or mistakenly operated the adjunct.

Referring to FIG. 4, the off-hook/on-hook status check circuit of FIG. 1 is shown in particular detail.

Opto-isolator subcircuit 5 comprises a photo-responsive transistor $5c$ which is responsive to two photo-emitting diodes $5a$ and $5b$ connected in parallel and with opposing polarity. Also included is circuitry which is useful for abating the effects of undesirable noise from the telephone subscriber loop, and for protecting the pulsing contact $K_1$ and opto-emitter diodes $5a$ and $5b$.

Noise from the telephone subscriber loop may be characterized as alternating current or message circuit noise and hits or impulse noise. Should an impulse be received by capacitor 4 when contact $K_1$ is broken, there might be an erroneous registering of an off-hook condition. Similarly, if $K_1$ is momentarily broken during a half wave peak of a low frequency alternating current (60 or 180 hz) signal, an erroneous registering might occur. The additional circuitry shown in FIG. 4 then serves to preserve that the voltage developed on capacitor 4 is a true voltage reflecting the direct current voltage received from the central office.

Zener diodes $D_1$ and $D_2$ having a detection threshold for voltage stored on capacitor 4 provide this noise immunity and are connected in series with capacitor 4. Additionally, biasing resistors $R_1$, $R_2$, and $R_3$ are provided for noise abatement. $R_1$ is connected in parallel with diodes $D_1$ and $D_2$, $R_2$ in series with capacitor 4, and $R_3$ in parallel with opto-emitting diodes $5a$ and $5b$. Resistors $R_1$, $R_2$, and $R_3$ in combination with capacitor 4 provide protection for contact $K_1$ and a resistive discharge path for current from capacitor 4. Additionally, $R_1$ and $R_3$ form a voltage divider network to prevent opto-emitter diodes $5a$ and $5b$ from turning on when voltages less than the threshold level are present. Varistor $V_1$, connected in parallel with opto-emitter diodes $5a$ and $5b$, is provided to further protect the opto-emitter diodes from high charge and discharge currents of capacitor 4.

In subscriber loop carrier system applications, subscriber telephone set 13 is noise isolated to a degree from the subscriber loop 1 by the inherent four wire operation of the carrier system. Additionally, in such systems only 7.5 volts of battery voltage may be provided to operate the pulsing contact $K_1$ of the adjunct and the network $13a$ of the telephone station set 13. Accordingly, the embodiment of FIG. 4 should be modified for subscriber loop carrier operation to provide as high a noise immunity as possible without causing detriment to pulsing or signaling characteristics.

Accordingly, in subscriber carrier system applications, resistor $R_1$ is shorted and diodes $D_1$ and $D_2$ are eliminated. In this manner, more direct current voltage is provided to capacitor 4, and sufficient noise immunity is provided by diodes $5a$ and $5b$, resistors $R_2$ and $R_3$, and varistor $V_1$.

TABLE A

| Component Values for On-hook/Off-hook Status Check Circuit (FIG. 4) | | | |
|---|---|---|---|
| Component | Value | Component | Value |
| $R_1$ | 62 KΩ | $D_1$ | 10 volts |
| $R_2$ | 620 Ω | $D_2$ | 10 volts |
| $R_3$ | 2.2 KΩ | Diode $5a$ | 1.2 volts |
| Cap. 4 | .511 μf | Diode $5b$ | 1.2 volts |

Because of the problem of abating the noise from the subscriber loop 1 while permitting sufficient voltages to accumulate on capacitor 4, the values chosen for the resistors $R_1$, $R_2$, and $R_3$; for capacitor 4; for the Zener diodes $D_1$ and $D_2$; and for opto-emitter diodes $5a$ and $5b$ should be considered of importance to the user of the present invention. Accordingly, in Table A are provided values for these elements. The inventors have experimentally demonstrated that these values represent one combination of values which obtain acceptable results.

We claim:
1. A circuit for sensing the switchhook status of a telephone station set (13) adapted to be connected in series in the tip (2) or the ring lead (3) of a telephone subscriber loop (1), remote from the telephone station set characterized in that
the switchhook status sensing circuit provides a predetermined output determinative of the off-hook status of the telephone station set,
the switchhook status sensing circuit comprising
a subcircuit (4) for storing electrical energy,
a subcircuit (5) connected in series with the energy storage subcircuit for providing the predetermined output responsive to discharge of electrical energy from the energy storage subcircuit and
a conditioning subcircuit ($K_1$), having two states, connected in parallel with the energy storage subcircuit and the output providing subcircuit, the first state for permitting the storing of energy from the telephone subscriber loop in the energy storage subcircuit if the telephone station set is off-hook and the second state for permitting the discharge of energy through the output providing subcircuit, such that
when the conditioning subcircuit proceeds from the first to the second state, the output providing subcircuit provides the predetermined output determinative of the off-hook status of the telephone station set or provides no output determinative of the on-hook status of the telephone station set.

2. A circuit for sensing the switchhook status of a telephone station set in accordance with claim 1
further characterized by
a plurality of subcircuits for providing immunity from noise generated along the telephone subscriber loop including
a first subcircuit ($D_1$, $D_2$, $R_1$, $R_2$) connected in series with the energy storage subcircuit and
a second subcircuit ($R_3$, $V_1$) connected in parallel with the output providing subcircuit.

3. A circuit for sensing the switchhook status of a telephone station set in accordance with claim 2
further characterized in that
the first subcircuit comprises a first resistor ($R_2$) connected in series with two Zener diodes ($D_1$, $D_2$) of opposing polarity, the Zener diode combination being connected in parallel with a second resistor ($R_1$) and
the second subcircuit comprises a resistor ($R_3$) in parallel with a varistor ($V_1$).

4. A circuit for sensing the switchhook status of a telephone station set in accordance with claim 2,
further characterized in that
the switchhook status sensing circuit is further adapted for use with telephone subscriber loop carrier systems, the first subcircuit comprising a resistor ($R_2$) and
the second subcircuit comprising a resistor ($R_3$) in parallel with a varistor ($V_1$).

5. A circuit for sensing the on-hook or off-hook status of a telephone station set, adapted to be connected in series between the tip or the ring lead of a telephone subscriber loop and the telephone station set,
characterized in that
the status sensing circuit provides a predetermined output determinative of the switchhook status of the telephone station set,
the status sensing circuit comprising
a capacitor (4),
an opto-emitter circuit (7) connected in series with the capacitor for detecting a change in voltage stored by the capacitor and for providing an optical output and
conditioning means ($K_1$) having two states connected across the series connected capacitor and opto-emitter circuit, the first state for permitting the storage of electrical energy from the telephone subscriber loop on the capacitor if the telephone station set is off-hook and the second state for permitting the discharge of energy through the opto-emitter circuit such that
when the conditioning means proceeds from the first to the second state, the opto-emitter circuit provides either an optical output or no output,
the optical output of the opto-emitter circuit identifying the off-hook status of the telephone station set and
no output of the opto-emitter circuit identifying the on-hook status of the telephone station set.

6. In combination with a dial pulse signaling system (10), a circuit for sensing the switchhook status of a telephone station set connected in series between the tip or the ring lead of a telephone subscriber loop and the telephone station set and in parallel with the pulsing contact ($K_1$) of the dial pulse signaling system, the pulsing contact having break and make states,
characterized in that
the circuit provides a predetermined output during the make portion of the dial pulse signaling interval determinative of the off-hook status of the telephone station set, the status sensing circuit comprising
a capacitor (4) adapted to be charged during the break portion of the dial pulse signaling interval by voltage from the telephone subscriber loop if the telephone set is off-hook,
an opto-emitter circuit (7) connected in series with the capacitor for detecting a change in voltage stored by the capacitor, and
an opto-responder circuit (8) responsive to the opto-emitter circuit for providing the predetermined output such that,
when the pulsing contact ($K_1$) proceeds from the break to the make state, the opto-responder circuit provides the predetermined output determinative of the off-hook status of the telephone station set or no output determinative of the on-hook status of the telephone station set.

7. A circuit for sensing switchhook status in accordance with claim 6 wherein the dial pulse signaling system comprises a microprocessor (11)
further characterized in that
the microprocessor, responsive to no output of the opto-responder circuit (8), aborts dial pulse signaling and, responsive to the predetermined output of the opto-responder circuit, continues dial pulse signaling.

8. In combination:

means for opening and closing a circuit path, the circuit path opening and closing means being adapted for connection in series with the tip or the ring lead of a telephone subscriber line; and a circuit for determining the switchhook status of a telephone station set associated with the telephone subscriber line, the circuit being responsive to and connected in parallel with the circuit path opening and closing means.

9. A circuit for determining the switchhook status of a telephone station set connected to a telephone subscriber line, the circuit comprising:

first means, adapted to be connected in series with the tip or the ring lead of the subscriber line, for opening and closing the lead path; and second means connected in parallel with the first means, the second means generating a signal indicative of the switchhook status of the telephone station set responsive to the first means.

10. A circuit for determining the switchhook status of a telephone station set as recited in claim 9, the recited second means comprising means for storing electrical energy, and means, connected in series therewith, for generating the signal indicative of the switchhook status of the telephone station set.

11. A circuit for determining the switchhook status of a telephone station set connected to a telephone subscriber line, the circuit being adapted to be connected in series with the tip or the ring lead of the telephone subscriber line, the circuit comprising means for storing electrical energy;

means, connected in series with the electrical energy storing means, for providing an output indicative of the switchhook status of the telephone station set; and conditioning means connected in parallel with the electrical energy storing means and the output providing means, the conditioning means having two states, the conditioning means permitting in its first state the storing of electrical energy from the telephone subscriber line and permitting in its second state the discharge of electrical energy through the output providing means.

* * * * *

UNITED STATES PATENT AND TRADEMARK OFFICE
CERTIFICATE OF CORRECTION

PATENT NO. : 4,317,964
DATED : March 2, 1982
INVENTOR(S) : Ronald D. Biggs and Peter O. Schuh It is certified that error appears in the above—identified patent and that said Letters Patent is hereby corrected as shown below:

In the Abstract, line 18, after "dial", first occurrence, insert --pulse--.

Signed and Sealed this

First Day of June 1982

[SEAL]

Attest:

Attesting Officer

GERALD J. MOSSINGHOFF
Commissioner of Patents and Trademarks